United States Patent
Cochrane

(10) Patent No.: US 9,702,457 B2
(45) Date of Patent: Jul. 11, 2017

(54) ENCLOSURE AFFIXABLE TO OUTER SECTION OF VEHICLE TRANSMISSION

(71) Applicant: Brian James Cochrane, Fort McMurray (CA)

(72) Inventor: Brian James Cochrane, Fort McMurray (CA)

(*) Notice: Subject to any disclaimer, the term of this patent is extended or adjusted under 35 U.S.C. 154(b) by 116 days.

(21) Appl. No.: 14/720,870

(22) Filed: May 25, 2015

(65) Prior Publication Data

US 2016/0348787 A1 Dec. 1, 2016

(51) Int. Cl.
*F16H 61/36* (2006.01)
*F16H 57/029* (2012.01)
*F16H 57/02* (2012.01)

(52) U.S. Cl.
CPC ........... *F16H 61/36* (2013.01); *F16H 57/029* (2013.01); *F16H 2057/02082* (2013.01)

(58) Field of Classification Search
CPC ................ F16H 61/36; F16H 57/029; F16H 2057/02082
See application file for complete search history.

(56) References Cited

U.S. PATENT DOCUMENTS

| 4,873,893 A * | 10/1989 | Blakemore | F16H 29/04 |
| | | | 475/16 |
| 5,615,576 A | 4/1997 | Kataumi et al. | |
| 8,490,507 B2 * | 7/2013 | Sun | F16H 23/02 |
| | | | 74/125.5 |
| 2008/0261735 A1 | 10/2008 | Cappellini | |
| 2010/0326226 A1 | 12/2010 | Walston | |

FOREIGN PATENT DOCUMENTS

| CA | 2578516 | 11/2010 |
| CN | 202213486 | 5/2012 |
| CN | 202927008 | 5/2013 |
| CN | 202955106 | 5/2013 |

* cited by examiner

*Primary Examiner* — Faye M Fleming
(74) *Attorney, Agent, or Firm* — Giuseppe Mariconda

(57) ABSTRACT

An apparatus is for a vehicle including a transmission. The apparatus includes an enclosure. A connection device is configured to affix the enclosure to an outer section of the transmission.

15 Claims, 5 Drawing Sheets

ENCLOSURE AFFIXABLE TO OUTER SECTION OF VEHICLE TRANSMISSION

TECHNICAL FIELD

This document relates to the technical field of (and is not limited to) an enclosure that is affixable to an outer section of a transmission of a vehicle.

BACKGROUND

Off-roading is the activity of driving or riding a vehicle on unsurfaced roads or tracks, made of materials such as sand, gravel, riverbeds, mud, snow, rocks, and other natural terrain and/or debris. Traveling on off-road terrains requires vehicles capable of accommodating off-road driving conditions. Typically, these vehicles accommodate off road conditions with extended ground clearance, off-road tires, etc.

SUMMARY

It will be appreciated that there exists a need to mitigate (at least in part) at least one problem associated with the existing transmissions of vehicles (also called the existing technology). After much study of the known systems and methods with experimentation, an understanding of the problem and its solution has been identified and is articulated as follows:

From time to time, unwanted debris (such as, mud, etc.) may build up around a shifter linkage positioned from (spaced apart from) an outer section of the transmission of a vehicle. When this condition occurs, the vehicle may not operate properly.

To mitigate, at least in part, at least one problem associated with the existing technology, there is provided (in accordance with a major aspect) an apparatus. The apparatus is for a vehicle. The vehicle includes a transmission having an outer section. A rotatable shifter shaft extends from the outer section of the transmission. A shifter linkage is affixed to and extends from the rotatable shifter shaft. A shifter cable is affixed to the shifter linkage. This is done in such a way that once the shifter cable is moved, the rotatable shifter shaft rotates and urges the rotatable shifter shaft to rotate. The apparatus includes an enclosure and a connection device configured to affix the enclosure to the outer section of the transmission. The enclosure is configured to enclose a connection between the shifter cable and the shifter linkage once the enclosure is affixed to the outer section of the transmission just so. The enclosure is also configured to enclose the rotatable shifter shaft once the enclosure is affixed to the outer section of the transmission just so. The enclosure is also configured to reduce unwanted debris (such as, mud, etc.) from building up around (and accumulating on) the shifter linkage once the enclosure is affixed to the outer section of the transmission just so.

Other aspects are identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which.

Figure 1:
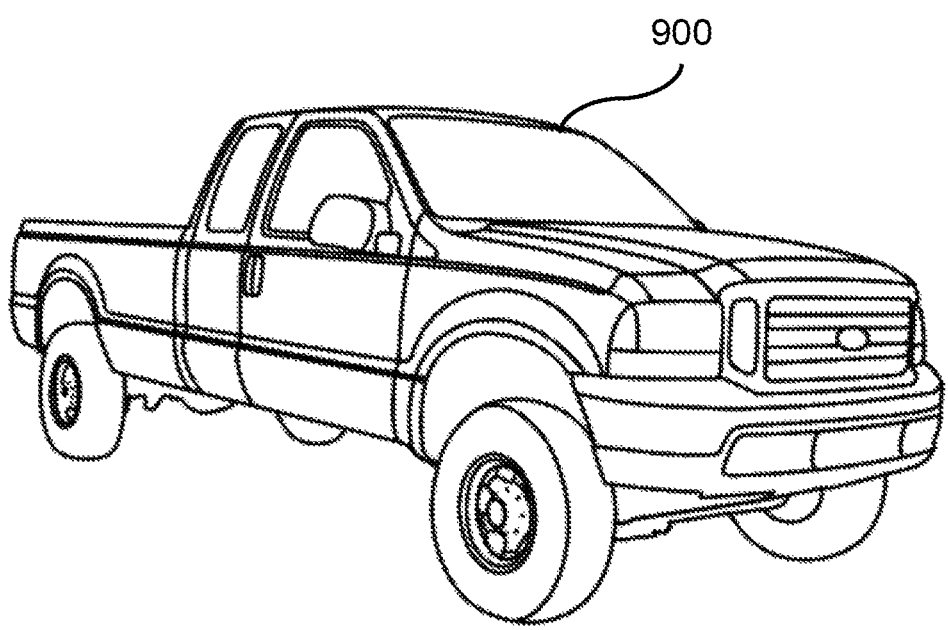
FIG. 1 (SHEET 1 of 5 SHEETS) depicts a perspective view of an embodiment of a vehicle.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 apparatus
102 enclosure
104 connection device
106 open box formation
108 cover
110 connection channel
112 passageway
113 first grommet
114 channel
115 second grommet
116 elongated shaft
900 vehicle
902 transmission
903 outer section
904 rotatable shifter shaft
906 shifter linkage
908 shifter cable

DETAILED DESCRIPTION OF THE EXEMPLARY EMBODIMENTS

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIG. 1 depicts a perspective view of an embodiment of a vehicle 900.

In accordance with the embodiment as depicted in FIG. 1, the vehicle 900 includes a pickup truck.

FIG. 2, FIG. 3, FIG. 4 and FIG. 5 depict perspective views of an apparatus 100 for the vehicle 900 of FIG. 1.

Figure 2:
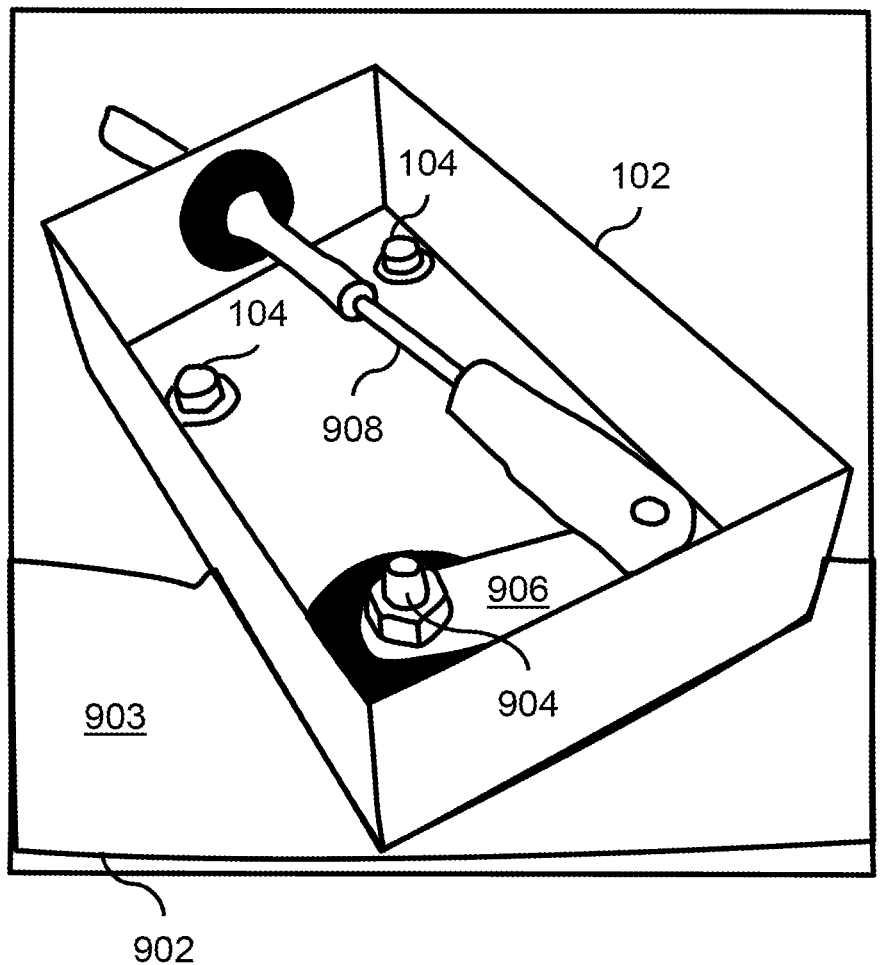
FIG. 2, FIG. 3, FIG. 4 and FIG. 5 (SHEETS 2 to 5 of 5 SHEETS) depict perspective views of an apparatus for the vehicle of FIG. 1.

Referring to FIG. 2, in accordance with a first major embodiment, the apparatus 100 is for the vehicle 900 (as depicted in FIG. 1). In accordance with the first major embodiment, the apparatus 100 does not include the vehicle 900. The vehicle 900 includes a transmission 902 having an outer section 903. A rotatable shifter shaft 904 extends from the outer section 903 of the transmission 902. A shifter linkage 906 is affixed to and extends from the rotatable shifter shaft 904. A shifter cable 908 is affixed to (coupled to) the shifter linkage 906. This is done in such a way that once the shifter cable 908 is moved, the rotatable shifter shaft 904 rotates and urges the rotatable shifter shaft 904 to rotate.

Referring to FIG. 2, the apparatus 100 includes (and is not limited to) an enclosure 102. The enclosure 102 includes a connection device 104 configured to affix the enclosure 102 to the outer section 903 of the transmission 902. The enclosure 102 is configured to enclose a connection between the shifter cable 908 and the shifter linkage 906 once the enclosure 102 is affixed to the outer section 903 of the transmission 902 just so. The enclosure 102 may be made from any suitable durable material, such as metal, etc., and the enclosure 102 is configured to be (preferably) rustproof, etc.

The enclosure 102 is also configured to enclose the rotatable shifter shaft 904 once the enclosure 102 is affixed to the outer section 903 of the transmission 902 just so. The enclosure 102 is also configured to reduce unwanted debris (such as, mud, etc.) from building up around (and accumulating on) the shifter linkage 906 once the enclosure 102 is affixed to the outer section 903 of the transmission 902 just so.

Referring to the embodiment as depicted in FIG. 2, in accordance with a second major embodiment, the apparatus 100 includes a synergistic combination of the vehicle 900 and the enclosure 102. The enclosure 102 is configured to prevent the buildup of debris (mud) on the shifter linkage 906. This is done in such a way that the shifter linkage 906 is movable (as may be required) so that the transmission 902 of the vehicle 900 continues to operate without the shifter linkage 906 becoming inadvertently disabled by an accumulation of unwanted debris on the shifter linkage 906. The enclosure 102 is useful for extreme mud conditions such as mining operations and/or off-road conditions. The enclosure 102 reduces downtime of the vehicle due to muddy conditions.

Referring to the embodiment as depicted in FIG. 2, the connection device 104 is configured to connect the enclosure 102 to an existing bracket (known and not depicted) that holds the shifter cable 908 in position. The shifter cable 908 urges (in operation) the rotatable shifter shaft 904 to shift the transmission 902 from neutral to drive, etc.

Figure 3:
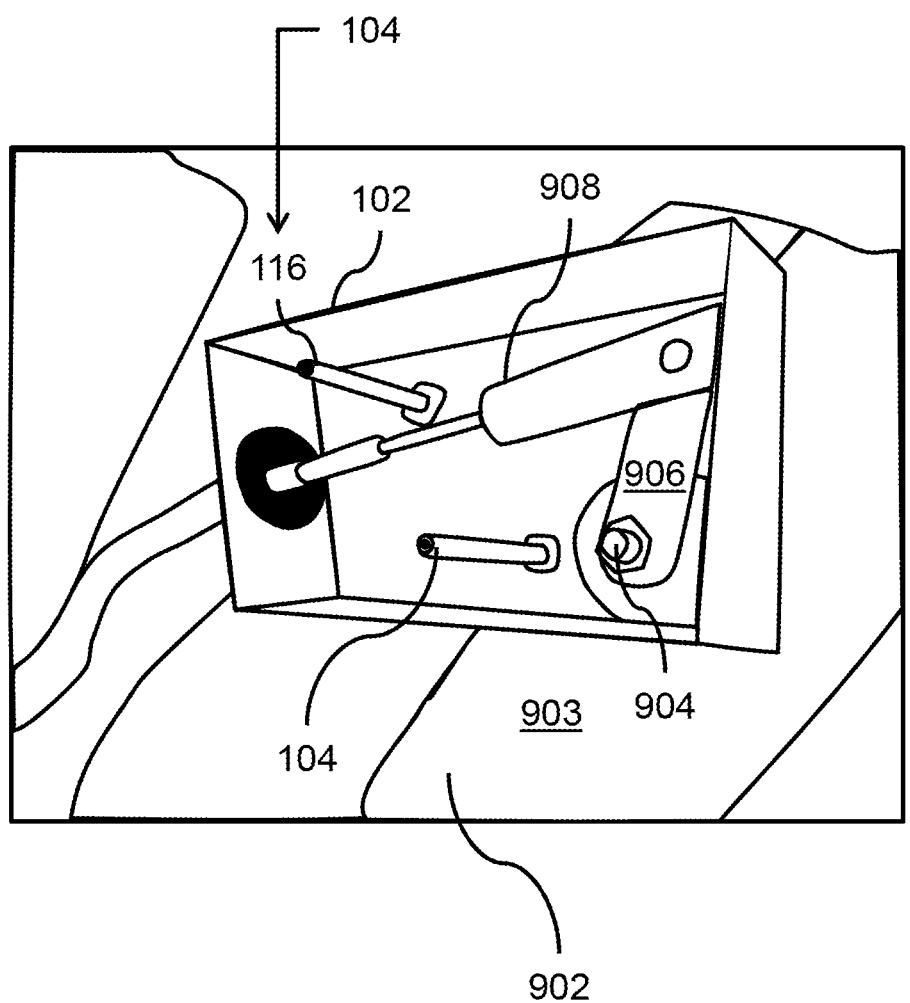

Referring to the embodiment as depicted in FIG. 3, the enclosure 102 is placed in an open condition in which the interior chamber defined by the enclosure 102 is exposed. The connection device 104 includes an elongated shaft 116 extending between opposite sides of the enclosure 102.

Figure 4:
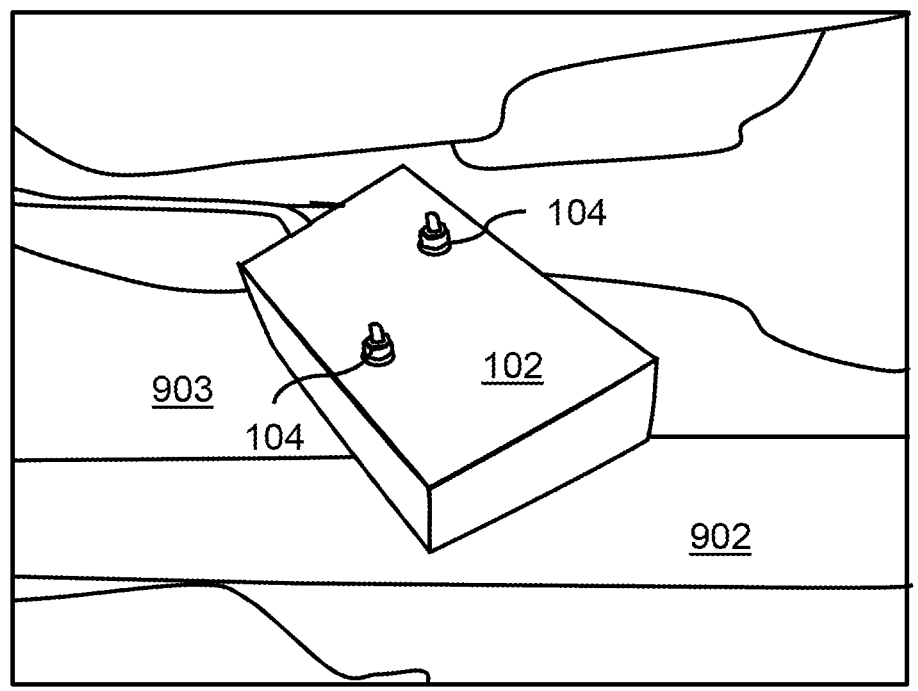

Referring to the embodiment as depicted in FIG. 4, the enclosure 102 is configured to be closed in such a way that unwanted debris is prevented from entering the interior chamber defined by the enclosure 102. The connection device 104 is configured to attach (affix) the enclosure 102 to the outer section 903 of the transmission 902 (either directly or indirectly).

Figure 5:
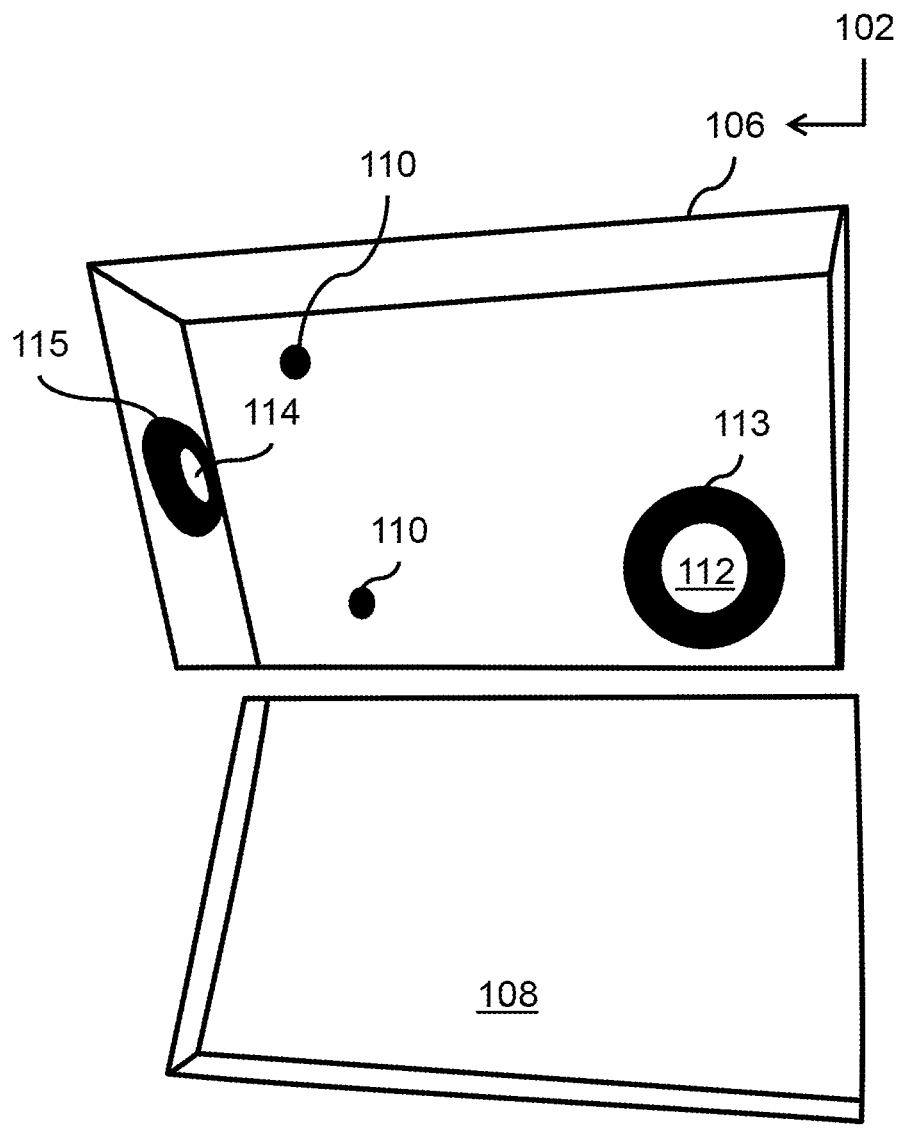

Referring to the embodiment as depicted in FIG. 5, the enclosure 102 includes an open box formation 106 having five sides with an open side leading into an interior chamber defined by the enclosure 102. The enclosure 102 includes a cover 108 configured to be positioned to the open side of the open box formation 106. The cover 108 is positioned in such a way as to show the interior chamber of the enclosure 102. The enclosure 102 defines a connection channel 110. The connection channel 110 is configured to receive the connection device 104 (as depicted in FIG. 2). The enclosure 102 also defines a passageway 112 configured to accommodate (receive) the rotatable shifter shaft 904 of the transmission 902 (as depicted in FIG. 2). A first grommet 113 is received in the passageway 112. The first grommet 113 may be called a sealing device. The first grommet 113 is configured to prevent inadvertent damage to the rotatable shifter shaft 904. The first grommet 113 may include a rubber material. The enclosure 102 also defines a channel 114 configured to accommodate (receive) the shifter cable 908 to be connected to the shifter linkage 906 (as depicted in FIG. 2). A second grommet 115 is received in the channel 114. The second grommet 115 may be called a sealing device. The second grommet 115 is configured to prevent inadvertent damage to the shifter cable 908. The second grommet 115 may include a rubber material.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. An apparatus for a vehicle including a transmission having an outer section, a rotatable shifter shaft extending from the outer section of the transmission, a shifter linkage affixed to and extending from the rotatable shifter shaft, and a shifter cable affixed to the shifter linkage in such a way that once the shifter cable is moved, the rotatable shifter shaft rotates and urges the rotatable shifter shaft to rotate, the apparatus comprising:
 an enclosure including a connection device being configured to affix the enclosure to the outer section of the transmission; and
 the enclosure being configured to:
  enclose a connection between the shifter cable and the shifter linkage once the enclosure is affixed to the outer section of the transmission just so;
  enclose the rotatable shifter shaft once the enclosure is affixed to the outer section of the transmission just so; and
  reduce unwanted debris from building up around the shifter linkage once the enclosure is affixed to the outer section of the transmission just so; and
 wherein the enclosure includes:
 an open box formation having five sides with an open side leading into an interior chamber defined by the enclosure; and
 the enclosure defines a passageway configured to accommodate the rotatable shifter shaft of the transmission;
 a first grommet is received in the passageway, and the first grommet is configured to prevent inadvertent damage to the rotatable shifter shaft;
 the enclosure defines a channel configured to accommodate the shifter cable to be connected to the shifter linkage; and
 a second grommet is received in the channel; and
 the second grommet is configured to prevent inadvertent damage to the shifter cable.

2. The apparatus of claim 1, wherein:
the vehicle includes a pickup truck.

3. The apparatus of claim 1, wherein:
the enclosure is configured to prevent a buildup of debris on the shifter linkage in such a way that the shifter linkage is movable so that the transmission of the vehicle continues to operate without the shifter linkage becoming inadvertently disabled by an accumulation of unwanted debris on the shifter linkage.

4. The apparatus of claim 1, wherein:
the connection device is configured to connect the enclosure to an existing bracket that holds the shifter cable in position.

5. The apparatus of claim 1, wherein:
the connection device includes an elongated shaft extending between opposite sides of the enclosure.

6. The apparatus of claim 1, wherein:
the enclosure is configured to be closed in such a way that unwanted debris is prevented from entering the interior chamber defined by the enclosure.

7. The apparatus of claim 1, further comprising:
a cover configured to be positioned at the open side of the open box formation.

8. The apparatus of claim 1, wherein:
the enclosure defines a connection channel; and
the connection channel is configured to receive the connection device.

9. An apparatus, comprising:
a vehicle including:
 a transmission having an outer section; and
 a rotatable shifter shaft extending from the outer section of the transmission; and
 a shifter linkage affixed to and extending from the rotatable shifter shaft; and
 a shifter cable affixed to the shifter linkage in such a way that once the shifter cable is moved, the rotatable shifter shaft rotates and urges the rotatable shifter shaft to rotate; and
 an enclosure including a connection device being configured to affix the enclosure to the outer section of the transmission; and
 the enclosure being configured to:
  enclose a connection between the shifter cable and the shifter linkage once the enclosure is affixed to the outer section of the transmission just so; and
  enclose the rotatable shifter shaft once the enclosure is affixed to the outer section of the transmission just so; and
  reduce unwanted debris from building up around the shifter linkage once the enclosure is affixed to the outer section of the transmission just so; and
 wherein the enclosure includes:
 an open box formation having five sides with an open side leading into an interior chamber defined by the enclosure; and
 the connection device includes an elongated shaft extending between opposite sides of the enclosure; and
 the enclosure defines a passageway configured to accommodate the rotatable shifter shaft of the transmission;
 a first grommet is received in the passageway, and the first grommet is configured to prevent inadvertent damage to the rotatable shifter shaft;
 the enclosure defines a channel configured to accommodate the shifter cable to be connected to the shifter linkage; and
 a second grommet is received in the channel, and the second grommet is configured to prevent inadvertent damage to the shifter cable.

10. The apparatus of claim 9, wherein:
the enclosure is configured to prevent a buildup of debris on the shifter linkage in such a way that the shifter linkage is movable so that the transmission of the vehicle continues to operate without the shifter linkage becoming inadvertently disabled by an accumulation of unwanted debris on the shifter linkage.

11. The apparatus of claim 9, wherein:
the enclosure includes:
a cover configured to be positioned at the open side of the open box formation.

12. The apparatus of claim 9, wherein:
the enclosure defines a connection channel; and
the connection channel is configured to receive the connection device.

13. The apparatus of claim 9, wherein:
the connection device is configured to connect the enclosure to an existing bracket that holds the shifter cable in position.

14. The apparatus of claim 9, wherein:
the enclosure is configured to be closed in such a way that unwanted debris is prevented from entering the interior chamber defined by the enclosure.

15. The apparatus of claim 9, wherein:
the vehicle includes a pickup truck.

\* \* \* \* \*